United States Patent [19]

Eom

[11] Patent Number: 5,450,377

[45] Date of Patent: Sep. 12, 1995

[54] MAGNETOOPTICAL RECORDING AND REPRODUCING APPARATUS HAVING AN AUTOMATIC HAND LIFTING DEVICE

[75] Inventor: Jae-yong Eom, Seoul, Rep. of Korea

[73] Assignee: Samsung Electronics Co., Ltd., Kyungki-do, Rep. of Korea

[21] Appl. No.: 131,540

[22] Filed: Oct. 5, 1993

[30] Foreign Application Priority Data

| Oct. 5, 1992 | [KR] | Rep. of Korea | 92-18175 |
| Jun. 1, 1993 | [KR] | Rep. of Korea | 93-09795 |
| Jun. 1, 1993 | [KR] | Rep. of Korea | 93-09798 |
| Jun. 1, 1993 | [KR] | Rep. of Korea | 93-09800 |

[51] Int. Cl.⁶ ............... G11B 13/04; G11B 21/12
[52] U.S. Cl. ................... 369/13; 369/77.2; 369/231; 369/244
[58] Field of Search ............ 369/13, 77.2, 215, 219, 369/231, 244, 249; 360/104, 105

[56] References Cited

U.S. PATENT DOCUMENTS

| 5,122,998 | 6/1992 | Mizuno et al. | 369/13 |
| 5,224,079 | 6/1993 | Inoue | 369/13 |
| 5,226,024 | 7/1993 | Mukawa | 369/13 |
| 5,247,496 | 9/1993 | Yamatani | 369/13 |
| 5,309,421 | 5/1994 | Fujisawa | 369/77.2 |
| 5,329,504 | 7/1994 | Mukawa | 369/13 |

FOREIGN PATENT DOCUMENTS 5-128616  5/1993  Japan ................ 369/13

*Primary Examiner*—Stuart S. Levy
*Assistant Examiner*—Paul J. Ditmyer
*Attorney, Agent, or Firm*—Sughrue, Mion, Zinn, Macpeak & Seas

[57] ABSTRACT

A magnetooptical recording/reproducing apparatus for recording and/or reproducing information from a magnetooptical disk seated in a disk cartridge by using an optical pickup and a magnetic head. A cartridge holding member pivots for loading a disk cartridge on a deck, and an ejecting member ejects the disk cartridge received in the cartridge holding member. Also, the apparatus has a connecting member for transporting the magnetic head together with the optical pickup and a slide member for raising or lowering a recordable disk cartridge by recognizing the recordability of the disk cartridge.

14 Claims, 18 Drawing Sheets

MAGNETOOPTICAL RECORDING AND REPRODUCING APPARATUS HAVING AN AUTOMATIC HAND LIFTING DEVICE

BACKGROUND OF THE INVENTION

1. Field of the Invention

The present invention relates to a magnetooptical recording and/or reproducing apparatus for irradiating a focused light beam on a magnetooptical recording medium and simultaneously applying a magnetic field thereacross to thereby record information thereon or reproduce the recorded information therefrom, and more particularly to a portable magnetooptical recording and reproducing apparatus using a magnetooptical disk cartridge having a magnetooptical disk therein.

2. Description of the Related Art

In general, a magnetooptical disk apparatus has an optical pickup for irradiating a focused light beam and a bias magnet for applying a magnetic field for the recording of desired information. A recording layer is provided in the disk for allowing the recording of information thereonto or reproduction of recorded information therefrom. The recording layer is composed of a magnetic material, for example, terbium ferrum (TbF) or terbium ferrum cobalt (TbFeCo). Such magnetooptical disks are generally enclosed in caddies, the caddy itself being loaded on a disk drive.

In recent years, a magnetooptical disk cartridge, commercially sold as a "mini disk" or MD, has been marketed by Sony (TM). The mini-disk is about 64 mm in diameter, and a player for the mini-disk is currently under ongoing development. There are two types of mini-disks currently on the market, a recordable type mini-disk shown in FIGS. 1A and 1B and a reproduction-only type mini-disk shown in FIGS. 2A and 2B.

Recordable mini-disk 1 has a cartridge shell 2 on both sides of which openings 3 and 4 are formed and a shutter 5 which slides along a sliding groove 6 for the simultaneous opening or closing of openings 3 and 4. A disk 9 in cartridge shell 2 is exposed through openings 3 and 4 on two opposite sides of the cartridge shell.

On the other hand, a reproduction-only mini-disk 1' has a cartridge shell 2' on one side of which an opening 3' is formed and a shutter 5' which slides along a sliding groove 6' for opening or covering opening 3'. In such a device, only one side of disk 9' is exposed via opening 3'.

In each of the above MDs, arrow marks 7 and 7' molded into the upper surfaces of cartridge cells 2 and 2' of mini-disks 1 and 1', respectively, indicate the direction in which mini-disk is inserted into a player. Moreover, cartridge shells 2 and 2' have recognition grooves 8 and 8' of different depths, by which the inserted mini-disk can be identified as being a recordable-type mini-disk or a reproduction-only type mini-disk through a sensor in the recording/reproduction device.

Sony's portable recording/reproducing player (model MZ-1) for mini-disks is currently on the market. This player has a slot for receiving the mini-disk in a slot-in method, a spindle motor for rotating the received mini-disk, an optical pickup for irradiating a focused light beam on one side of the disk, and a magnetic head for applying a magnetic field over the other side of the disk. The cartridge shell of the mini-disk which is received in the slot is loaded on a deck, with the shutter thereof slid open to open the opening. Simultaneously, the disk in the cartridge shell seats on a turntable which is rotated by a spindle motor. During the rotation of the disk, if a reproduction mode is selected, the magnetic head remains lifted to an "up" position and the optical pickup operates alone. If a recording mode is selected, the magnetic head is lowered to a "down" position by the motor to move together with the optical pickup which nearly contacts the opposite side of the disk. It should be noted that while the reproduction-only mini-disk is loaded, the magnetic head cannot be lowered, even if the recording mode is selected, due to an interlocking device in the player.

General requirements in portable disk players are that they should not only be light and compact, but should also consume low amount of electrical power. However, the Sony players for the use with mini-disks have a very complicated structure which requires a mini-disk inserting mechanism and a mechanism for raising the magnetic head by using a motor. Further, these mechanisms require a large amount of space. Thus, these players cannot be miniaturized or lightened. Also, a relatively large amount of power is required for the insertion or pulling back of the mini-disk and the raising and lowering of the magnetic head.

SUMMARY OF THE INVENTION

Therefore, it is an object of the present invention to provide a magnetooptical recording/reproducing apparatus which is light-weight, compact and consumes little power so as to be suitable for portability.

It is another object of the present invention to provide a magnetooptical recording/reproducing apparatus in which a magnetooptical disk cartridge is mechanically loaded/unloaded from the main body.

It is yet another object of the present invention to provide a magnetooptical recording/reproducing apparatus in which a magnetic head is mechanically raised and lowered according to whether or not the magnetooptical disk cartridge loaded on the main body is recordable.

To accomplish these objects, the recording/reproducing apparatus for recording/reproducing information, using a disk cartridge has a deck on which the disk cartridge is loaded, an optical pickup assembly movably seated on the deck to project a focused light beam onto one surface of the magnetooptical disk, and a magnetic head for applying a magnetic field onto the other surface of the magnetooptical disk. The apparatus further comprises a cartridge holding member which receives the disk cartridge and is rotatable with respect to the deck, so that the received disk cartridge moves from the closing position in which the disk cartridge is loaded on the top of the deck and to the opening position in which the received disk cartridge is detached from the top of the deck to be unloaded. A connecting member operates so that the magnetic head moves together with the optical pickup assembly in a radial direction of the magnetooptical disk and is rotatable in the movement direction of the cartridge holding member with respect to the optical pickup assembly. Also, a magnetic head lift is interlocked with the recordable disk cartridge which is inserted and extracted from the cartridge holding member, so as to raise or lower the magnetic head with respect to the magnetooptical disk of the recordable disk cartridge.

In the present invention, the cartridge holding member which is simplified and rotatably opens/closes is used so as to load the disk cartridge on the deck. Since the cartridge holding member only has enough receiving space for the disk cartridge loaded on the deck to be seated, the cartridge holding member occupies less space than that of a conventional slot-in configuration. Also, the power consumption is reduced since the member can be manually operated. Further, since the magnetic head is raised/lowered by mechanically engaging with the disk cartridge inserted into the holding member, the space occupied by the motor for raising and lowering the magnetic head is reduced while also reducing power consumption. Accordingly, the magnetooptical recording/reproducing apparatus of the present invention can be further minimized, consume less power, and is suitable for portability.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

A first preferred embodiment of a magnetooptical recording and reproducing apparatus according to the present invention is illustrated in FIGS. 1–18.

Figure 1A:
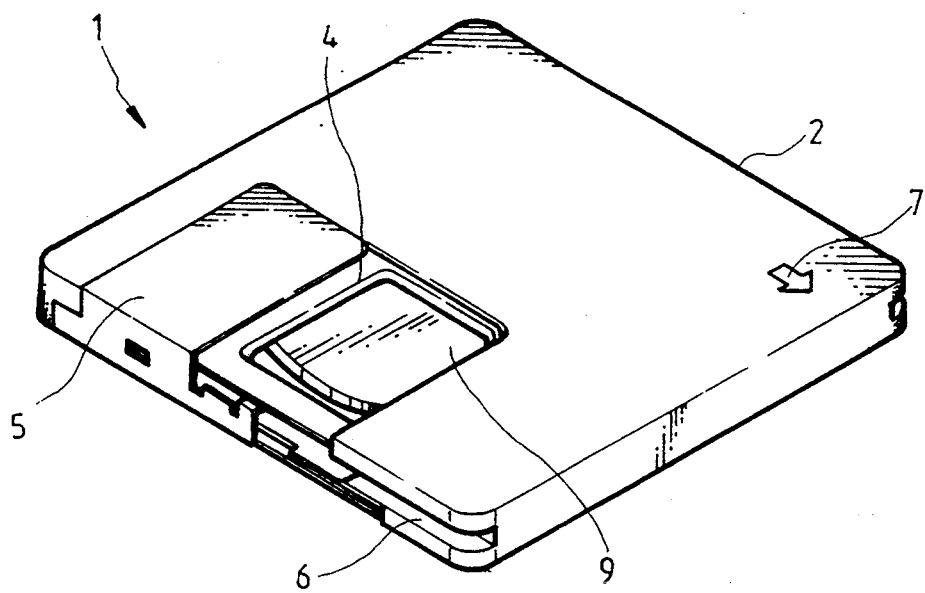
FIG. 1A is a top perspective view of a recordable magnetooptical disk cartridge to which the present invention and prior art can be applied.
Figure 1B:
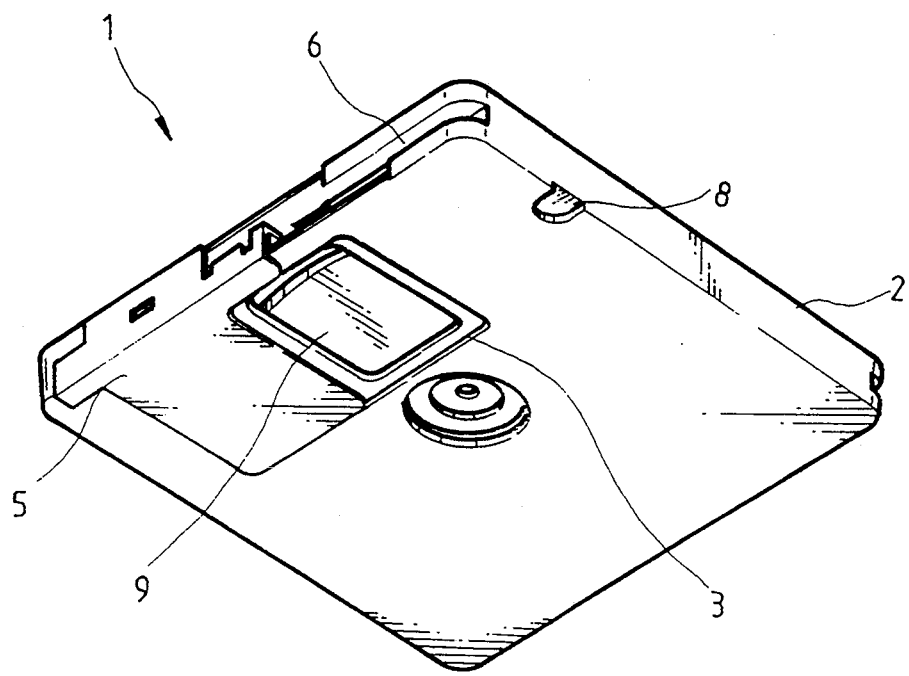
FIG. 1B is a bottom perspective view of a recordable magnetooptical disk cartridge shown in FIG. 1A.
Figure 2A:
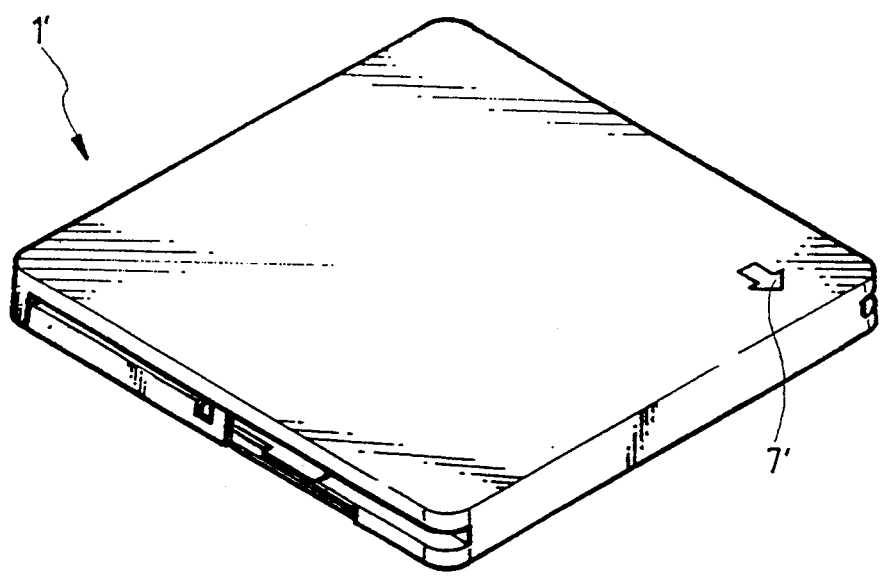
FIG. 2A is a top perspective view of a reproduction-only magnetooptical disk cartridge to which the present invention and prior art can be applied.
Figure 2B:
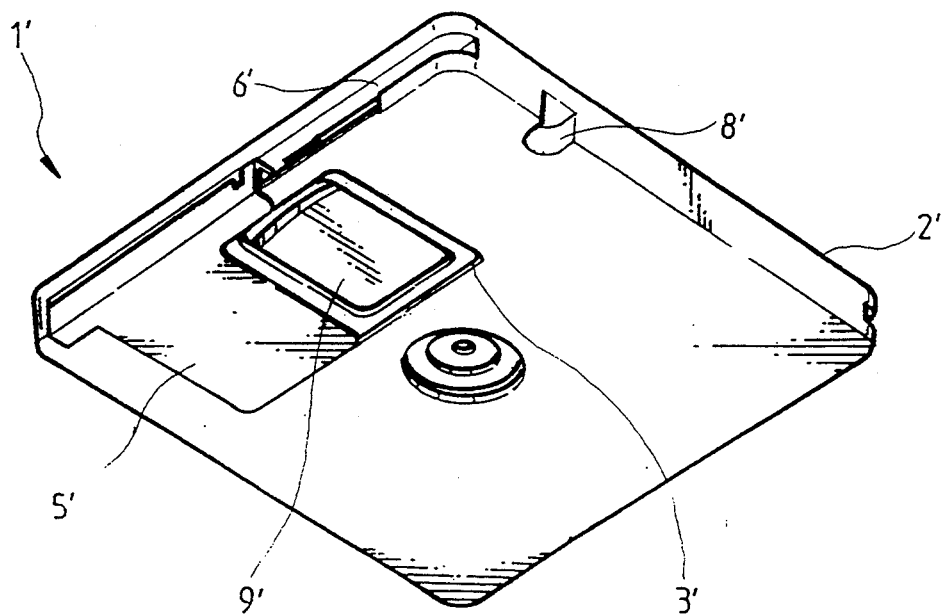
FIG. 2B is a bottom perspective view of a reproduction-only magnetooptical disk cartridge shown in FIG. 2A.
Figure 3:
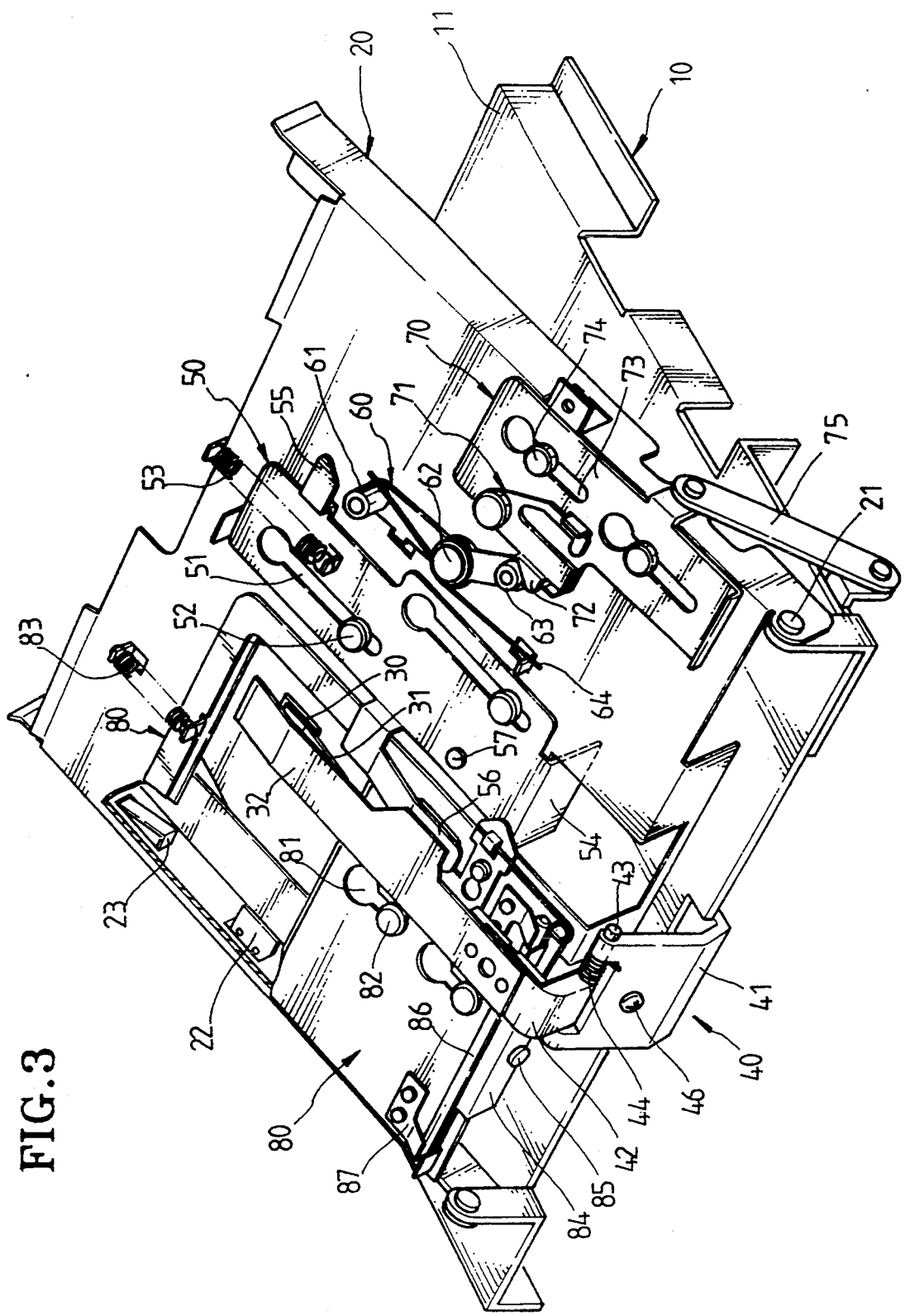
FIG. 3 is a perspective view of a magnetooptical recording/reproducing apparatus of the preferred embodiment of the present invention in which a cartridge holding member is opened.
Figure 4:
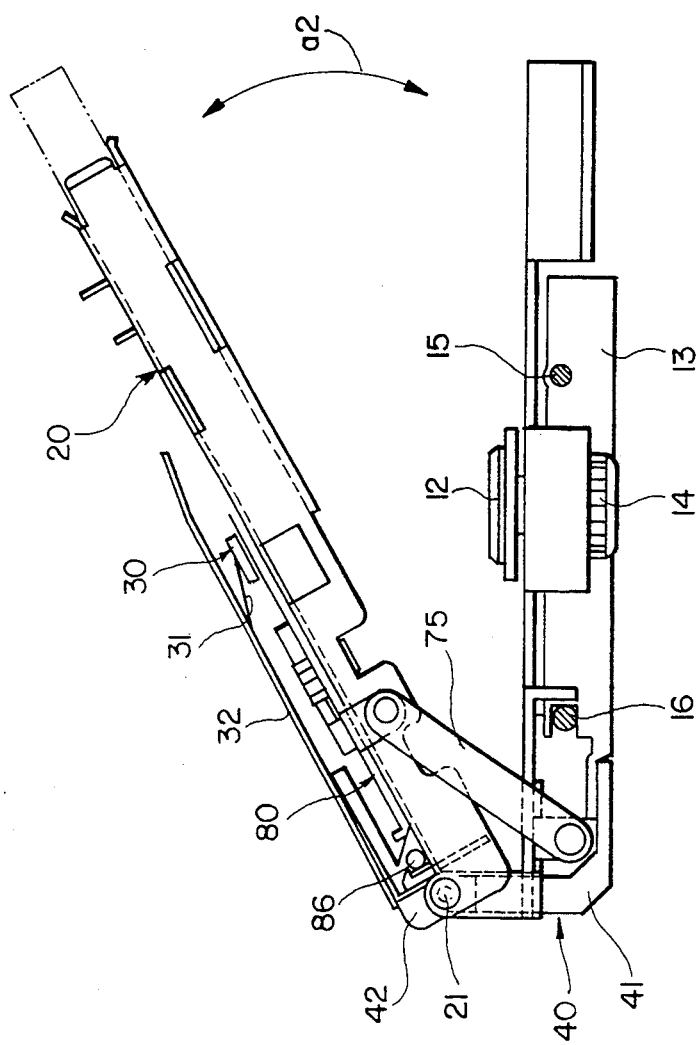
FIG. 4 is a side view of the magnetooptical recording/reproducing apparatus of the preferred embodiment.
Figure 5:
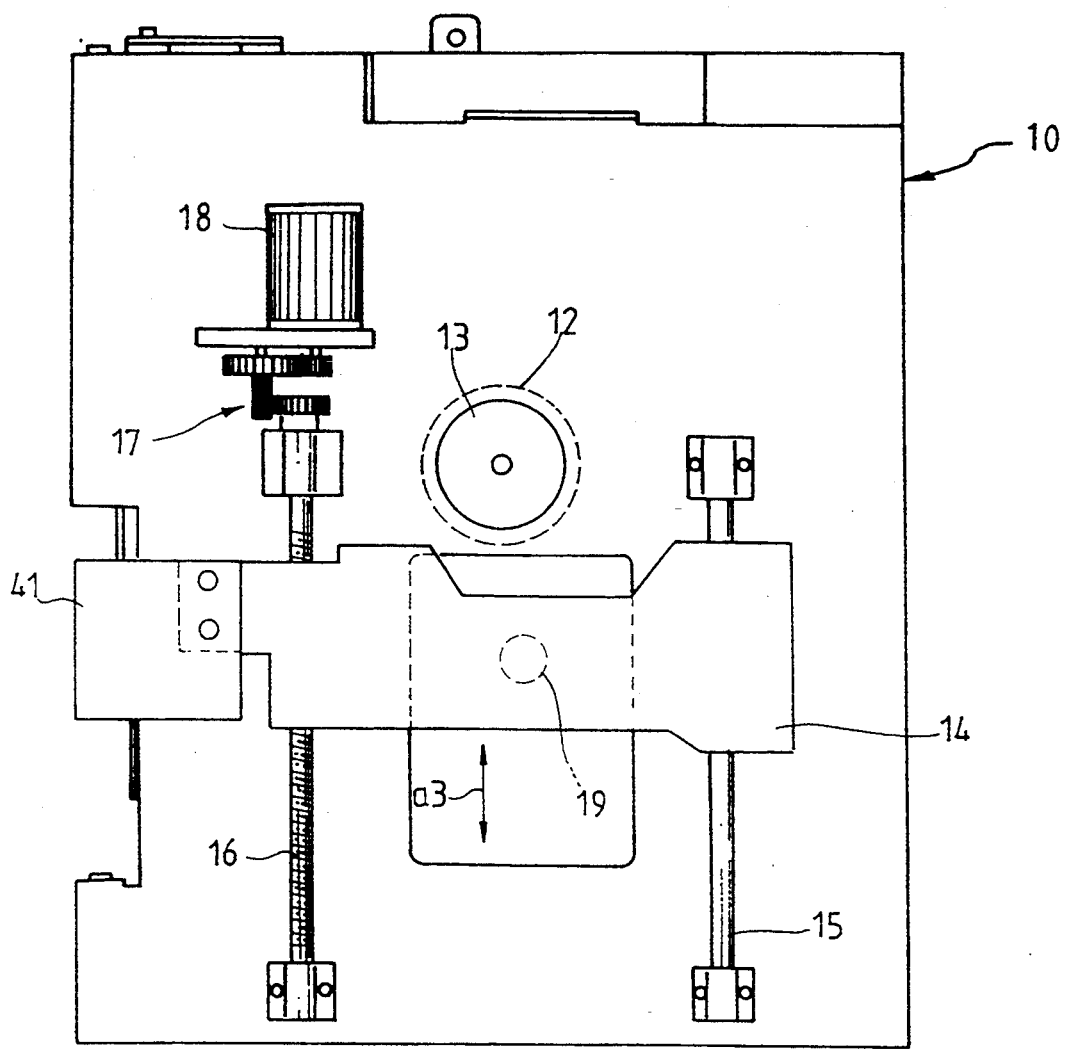
FIG. 5 is a bottom view of the magnetooptical recording/reproducing apparatus of the preferred embodiment.

In FIG. 3, deck 10 has an upper surface 11 on which mini-disk 1 of FIG. 1 or mini-disk 1' of FIG.2 is loaded. Referring to FIGS. 4 and 5, a turn-table 12 for receiving the magnetooptical mini-disk is installed on upper surface 11. The turn-table 12 is connected to a spindle motor 13 disposed beneath deck 10. An optical pickup assembly 14 is also installed below deck 10. The optical pickup assembly is supported by a guide bar 15 and screw axis 16, which are parallel to each other, so as to be moved in an a3 direction by the rotation of screw axis 16. Screw axis 16 is coupled to a transporting motor 18 via a gear group 17. Optical pickup assembly 14 includes an objective lens 19, and a light source (not illustrated). The light beam of the light source is focussed by objective lens 19 onto the surface of the magnetooptical disk seated on turn-table 12 of deck 10. Optical pickup assembly 14 also has a sensor (not illustrated) which receives the reflected light beam from the magnetooptical disk, and generates an electrical signal, i.e., a reproducing signal, in accordance with the reflected light.

Referring to FIGS. 3 and 4, cartridge holding member 20 receives mini-disk 1 of FIG. 1 or mini-disk 1' of FIG.2 which is inserted in an a1 direction. The cartridge holding member is hinged to deck 10 so as to be pivotable in an a2 direction as shown in FIG.4 to meet the upper surface of deck 10. Cartridge holding member 20 has on one sidewall thereof a shutter opener 22 for opening a shutter 5 or 5' (FIG. 1 or FIG.2) when mini-disk is inserted and a shutter closure 23 for returning the shutter when the minidisk is pulled back.

Figure 6:
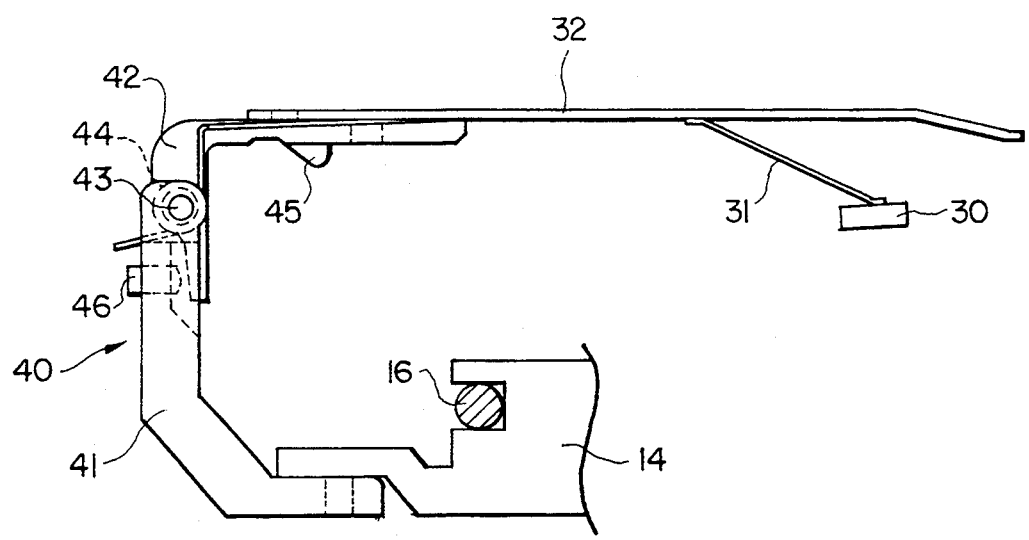
FIG. 6 is a side view of the connecting portion of an optical pickup assembly and magnetic head of the magnetooptical recording/reproducing apparatus shown in FIG. 3.
Figure 7:
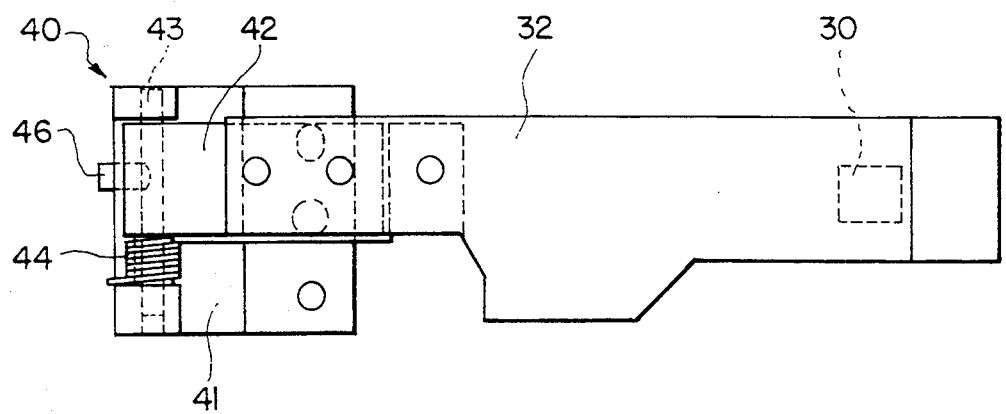
FIG. 7 is a plan view of the connecting portion of an optical pickup assembly and magnetic head shown in FIG. 6.

A magnetic head 30 is installed above cartridge holding member 20. Magnetic head 30 is attached to one end of a flexible leaf spring 31 which is supported by a head supporting member 32. FIGS. 6 and 7 illustrate a connecting member 40 for combining optical pickup assembly 14 and head supporting member 32. The connecting member 40 has a pickup connection portion 41 fixed to optical pickup assembly 14, a head connection portion 42 connected to head supporting member 32, and a hinge portion 43 for coupling pickup connection portion 41 to head connection portion 42. Hinge portion 43 and hinge 21, connecting deck 10 with cartridge holding member 20, are on the same axis. Therefore, optical pickup assembly 14 and magnetic head 30 can be transported in the a3 direction of FIG.5 by means of connection member 40, and magnetic head 30 can be pivoted in the a2 direction, which is the same as that of the opening and closing movement of cartridge holding member 20, together with head supporting member 32 and head connection portion 42. On the other hand, magnetic head 30 is elastically biased downward by means of a torsion spring 44 which extends to head connection portion 42 and is fitted over hinge portion 43 as a sleeve (see FIG. 7). Head connection portion 42 of connection member 40 has a protrusion 45 which protrudes downwardly, for engagement with a magnetic head lifting device described later. In addition, controlling screw 46 is screw-coupled with pickup connection portion 41 and extends therethrough. One end of the controlling screw contacts an end portion of head connection portion 42. The controlling screw thus controls the horizontal positional limit of head supporting member 32.

Figure 8:
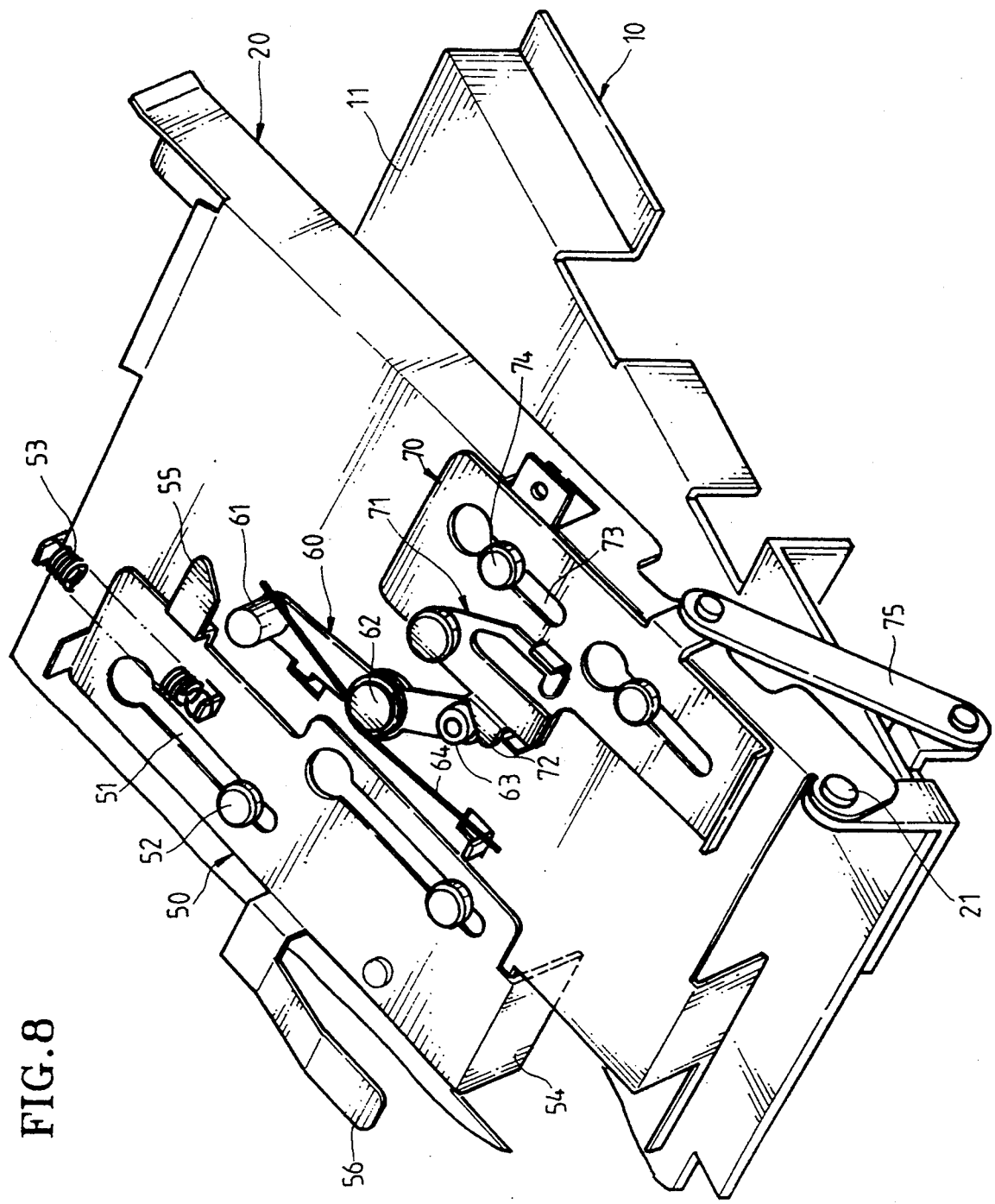
FIG. 8 is a perspective view of the cartridge extracting portion of the magnetooptical recording/reproducing apparatus shown in FIG. 3.

Referring to FIGS.3 and 8, cartridge holding member 20 has an ejecting device disposed on the upper surface thereof for ejecting the received mini-disk. The ejecting device is constituted of an ejecting member 50, a locking member 60 and a locking releasing member 70.

Ejecting member 50 is slidably supported to be capable of being transported forward or backward by means of a groove 51 and a supporting pin 52, and is elastically biased by spring 53 in a forward direction. Ejecting member 50 has a contact portion 54 which comes into contact with the front of a received mini-disk when it is inserted in cartridge holding member 20, a locking end 55 designed to be caught by locking pin 61 of locking member 60, and a head holder 56 extending alongside ejecting member 50 for holding head supporting member 32 of magnetic head 30 in an upward position.

Locking member 60 is supported by a pivot 62 to be capable of being rotated, while being elastically biased counterclockwise by a torsion spring 64, and has a locking releasing pin 63 on one end thereof. Locking releasing pin 63 moves along with protrusion 72 of spring member 71 supported by locking releasing member 70, so that locking pin 61 retreats in the clockwise direction when locking releasing member 70 is moved toward the upper right corner of FIG. 8.

Locking releasing member 70 is supported by groove 73 and supporting pin 74 to be capable of being translated forward or backward, and connects with deck 10 via link 75. Locking releasing member 70 is interlocked with the opening and closing movement of cartridge holding member 20, to thereby move forward or backward on cartridge holding member 20 with spring member 71 in response to opening and closing movement of cartridge holding member 20.

Figure 9:
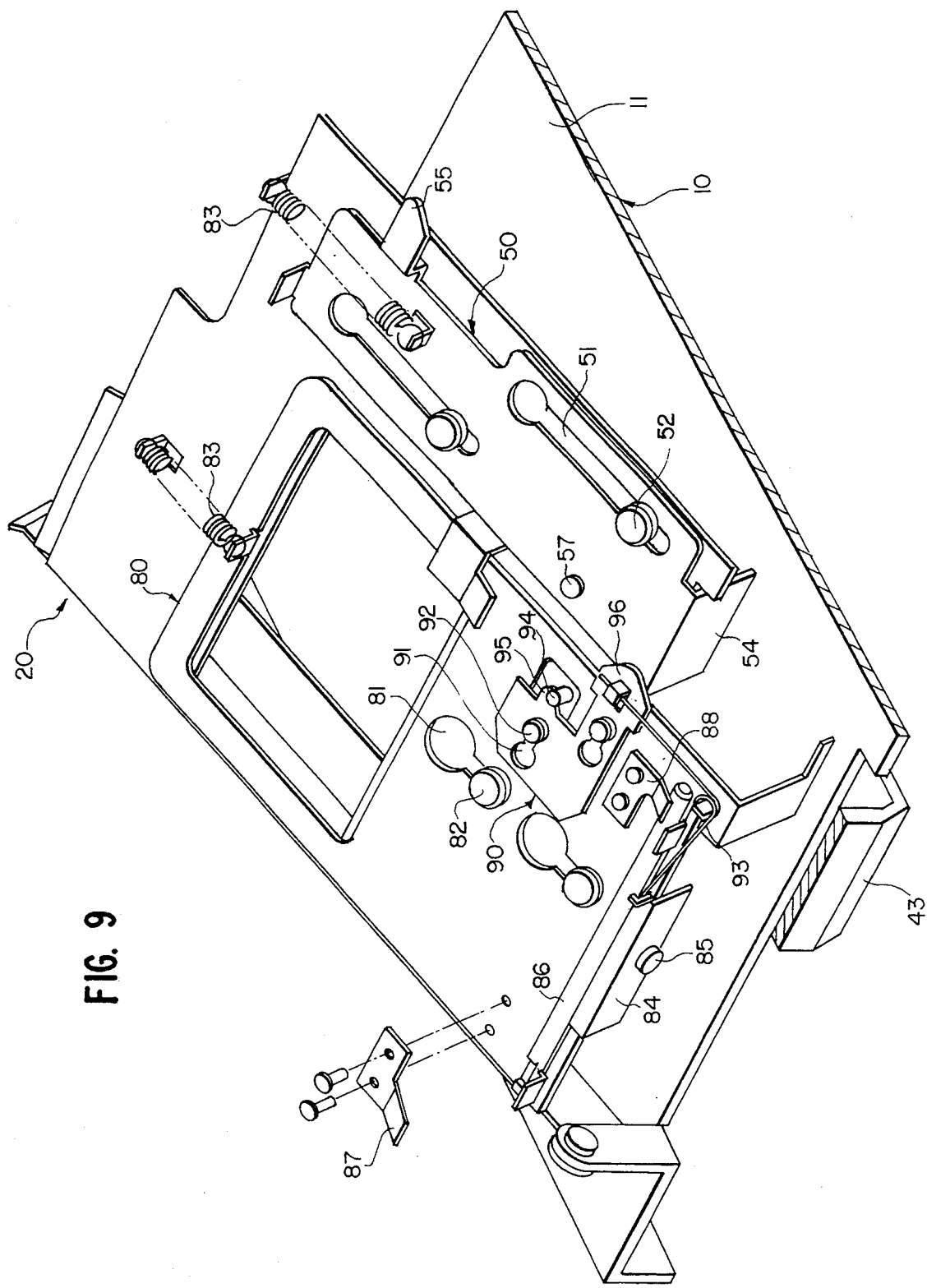
FIG. 9 is a perspective view of the magnetic head raising/lowering portion of the magnetooptical recording/reproducing apparatus shown in FIG. 3.

As illustrated in FIG.3, a slide member 80 is installed on the upper surface of cartridge holding member 20. Slide member 80 is configured to distinguish whether or not the received mini-disk is the recordable type. In particular, if a recordable mini-disk 1 (FIG. 1) is received, the slide member interlocks with mini-disk 1 to raise or lower magnetic head 30. Slide member 80 is supported by groove 81 and supporting pin 82 to move a short distance forward or backward, as shown in FIG.9, and is elastically biased forwardly by spring 83. Also, sliding member 80 has a protruded pin 85 on a bent portion 84 thereof. Protruded pin 85 is located and is of a predetermined size so that pin 85 cannot be inserted into recognition groove 8 of a recordable mini-disk 1, but can be inserted into recognition groove 8' of reproduction-only mini-disk 1'.

Referring to FIG.9, a head holding bar 86 is installed on slide member 80 and held in place by two fixing plates 87 and 88, and is about the same length as the radius of the magnetooptical disk. Slide member 80 has a supporting pin 92, and a locking member 90 having a groove 91 is supported by supporting pin 91 to be able to move latitudinally. In addition, the locking member is elastically biased toward extracting member 50 by torsion spring 93. Slide locking member 90 includes a locking portion 95 which catches on the rear part of a locking pin 94 installed on cartridge holding member 20 and a locking releasing portion 96 triggered by a triggering pin 57 installed on extracting member 50 so as to retreat to unlock the engagement between locking portion 95 and locking pin 94 when triggering pin 57 engages with locking releasing portion 96.

Operation of the magnetooptical recording and reproducing apparatus according to the first preferred embodiment of the present invention will be described, hereinafter.

Figure 10:
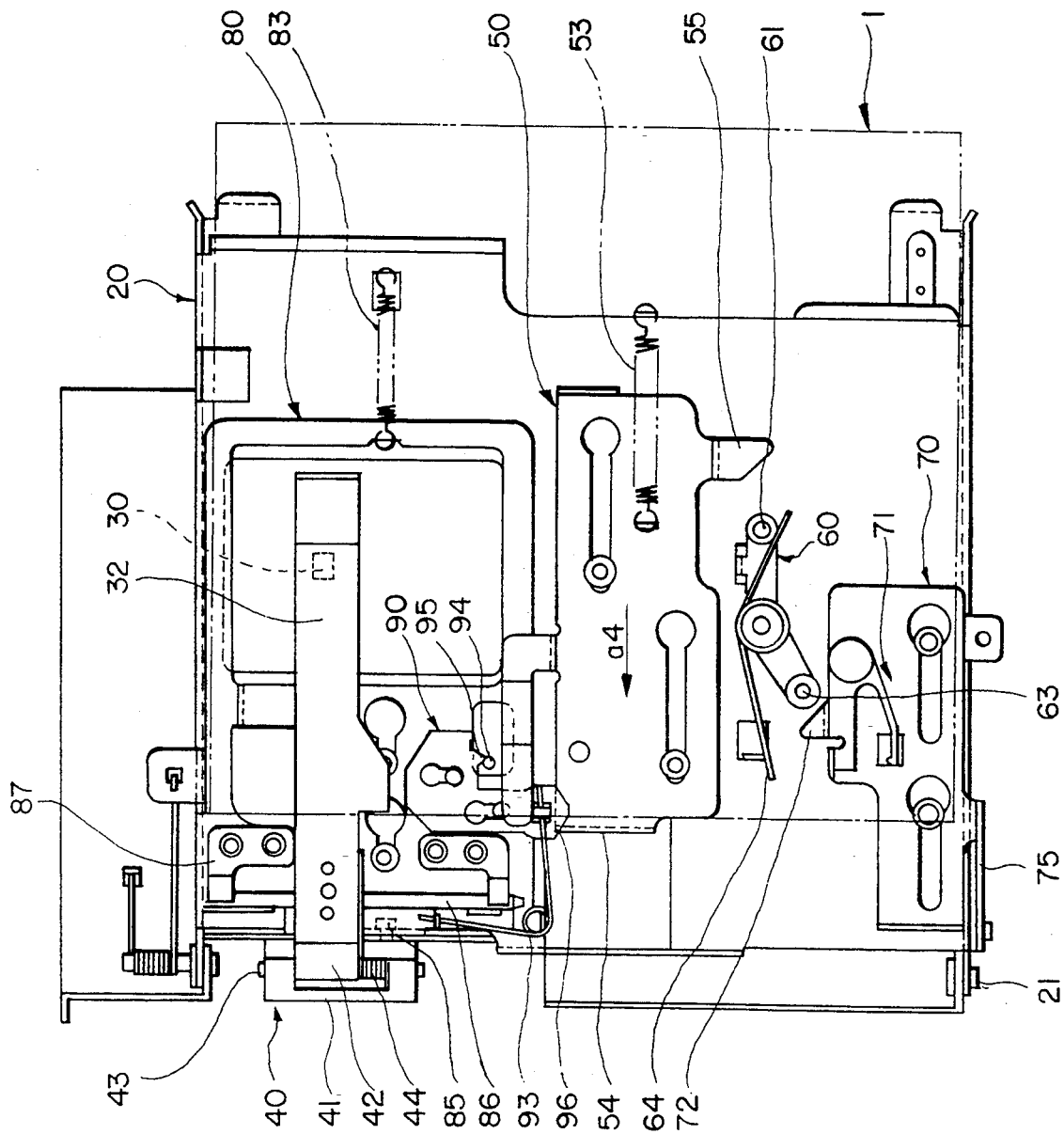
FIG. 10 is a plan view to illustrate an initial state in which a mini disk is inserted into the cartridge holding member of the magnetooptical recording/reproducing apparatus shown in FIG. 3.
Figure 11:
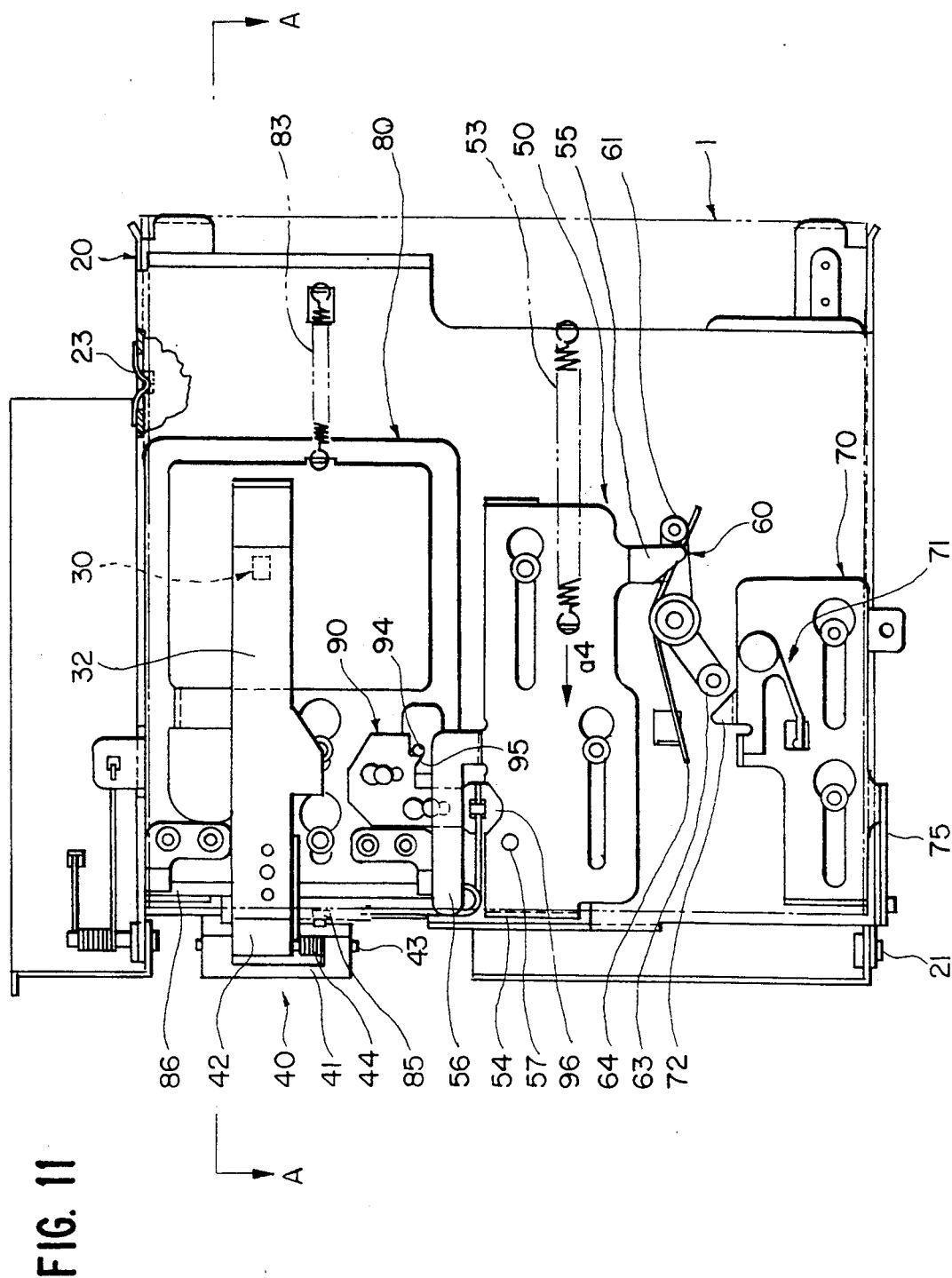
FIG. 11 is a plan view to illustrate a state in which a recordable mini disk is inserted into the cartridge holding member of the magnetooptical recording/reproducing apparatus shown in FIG. 3.

FIGS. 10–14 illustrate the operation of the apparatus, using a recordable mini-disk 1. When cartridge holding member 20 is in an open position, mini-disk 1 is placed into cartridge holding member 20 by the operator as shown in FIG. 10. Therefore, the front part of mini-disk 1 just contacts a contact portion 54 of ejecting member 50. In the meantime, if mini-disk 1 is pushed in further, ejecting member 50 is slid in an a4 direction, to thereby extend spring 53. Consequently, locking part 55 of ejecting member 50 engages with a locking pin 61 of a locking member 60. Locking part 55, one side of which is sloped, advances while pushing locking pin 61 downward in FIG. 10, and then locking pin 61 returns back to its original position immediately after locking part 55 has passed locking pin 61, so that the locking function is completed as shown in FIG. 11. In other words, ejecting member 50 is now locked in a rearward position.

Figure 13:
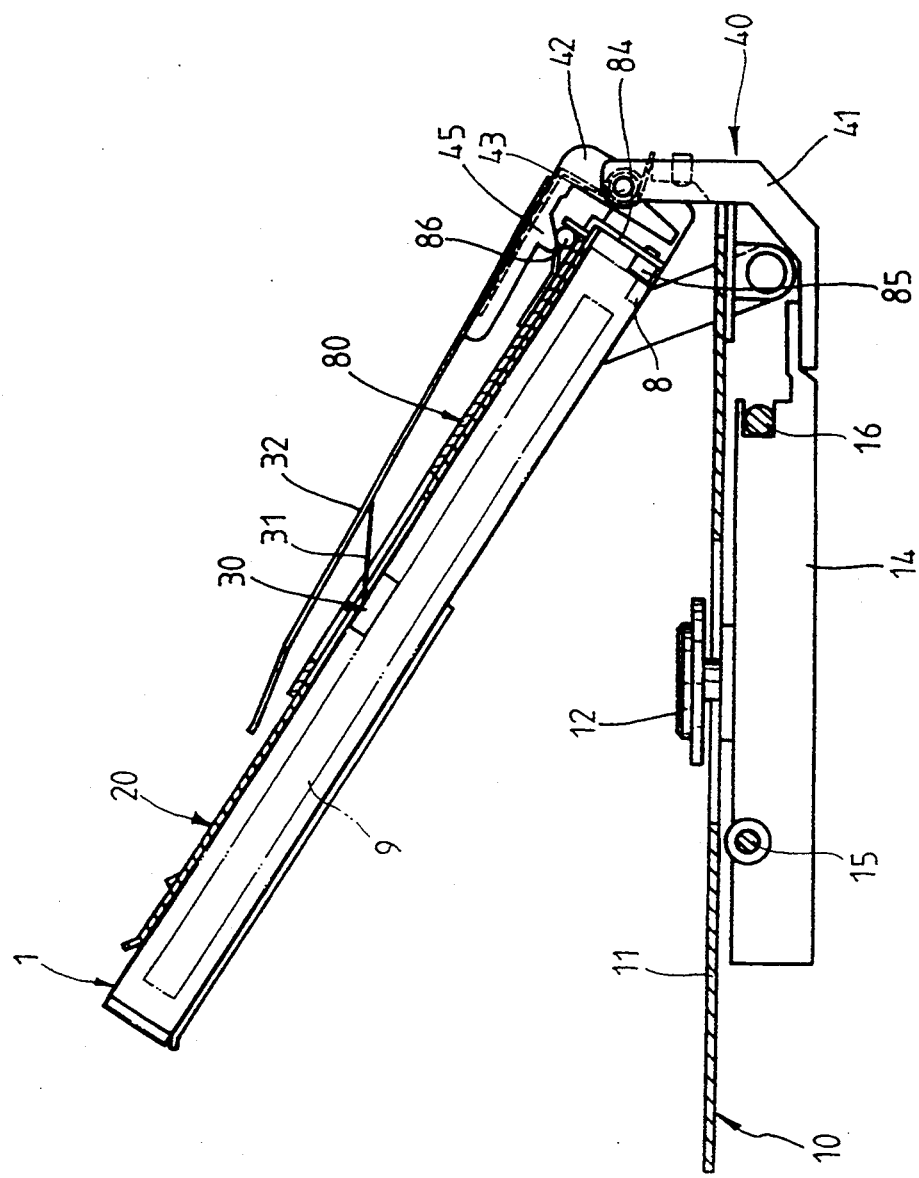
FIG. 13 is a cross-sectional view of the magnetooptical recording/reproducing apparatus of the preferred embodiment, taken along line A—A of FIG. 11.

Referring to FIG. 13, it can be seen that a protruded pin 85 extending from bending portion 84 of sliding member 80 does not enter recognition groove 8 of mini-disk 1, but contacts the forepart of mini-disk 1. Accordingly, slide member 80 is pushed back to thereby retract holding bar 86 which supports protruded portion 45 of head connection portion 42 of connection member 40 to allow magnetic head 30 to be positioned in a recording position proximate mini-disk 1. Thus, magnetic head 30 is lowered to make contact with magnetooptical disk 9 of mini-disk 1.

In the meantime, slide member 80 is pushed back a short distance from the initial position. Locking portion 95 of locking member 90 is locked by engagement with locking pin 94, as shown in FIG. 11, so that a spring 83 for restoring slide member 80 does not cause mini-disk 1 to come back out of the player via its insertion path.

Figure 12:
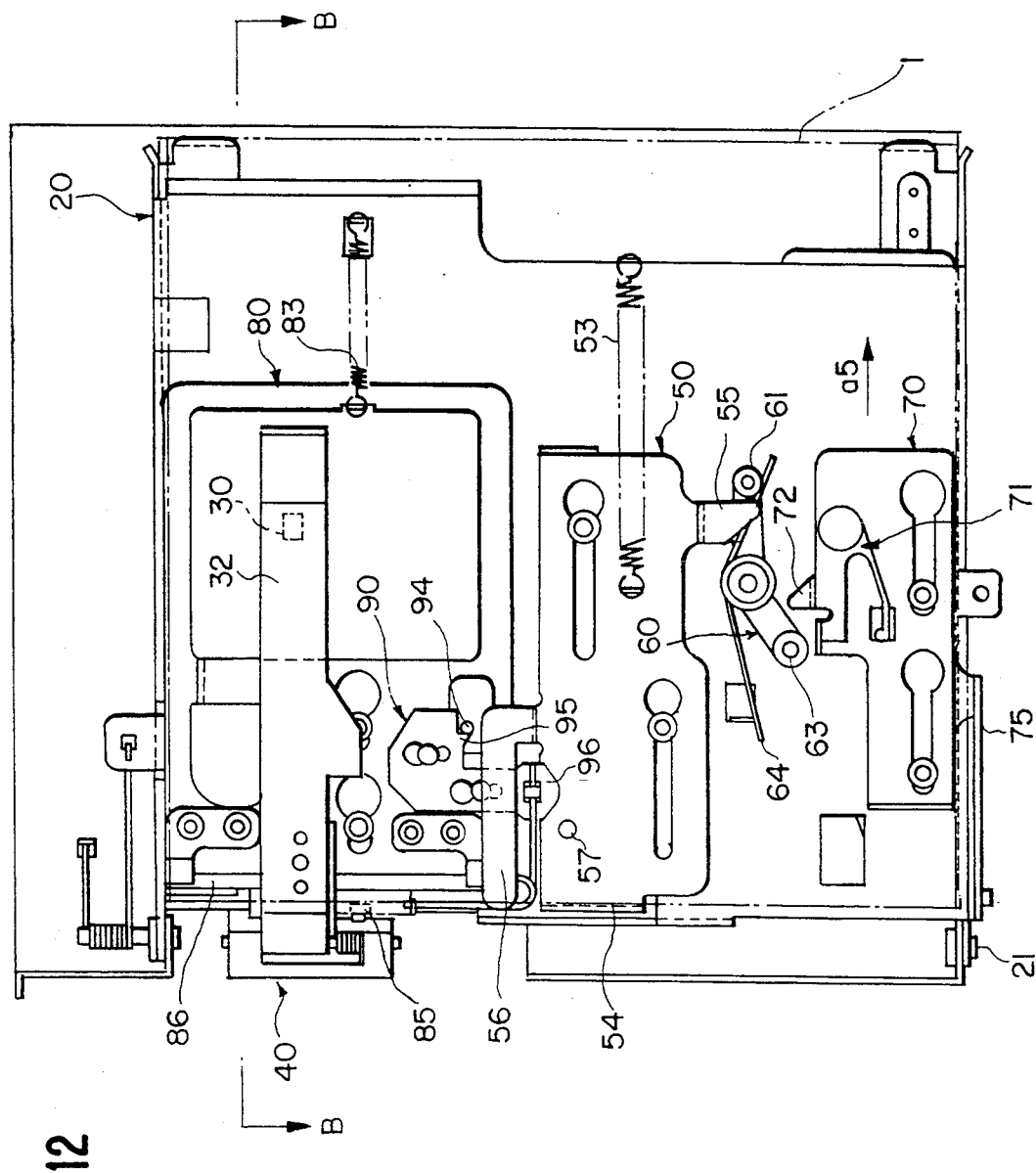
FIG. 12 is a plan view to illustrate a state in which a recordable mini disk inserted into the cartridge holding member of the magnetooptical recording/reproducing apparatus shown in FIG.3 is finished being loaded onto deck.

Referring to FIGS. 12 and 13, when cartridge holding member 20 moves down to load mini-disk 1 held therein on the upper surface of deck 10, protrusion 72 of spring member 71 supported by locking releasing member 70 moves in an a5 direction, as shown in FIG. 12, by the interlocking of cartridge holding member 20 and link 75 (FIG.3), to thereby be positioned in front of locking releasing pin 63 of locking member 60. Spring member 71 has a lower elasticity than that of a torsion spring 64 elastically biasing locking member 60 in a counterclockwise direction, which prevents the possible release of locking member 60. In the closed condition as shown in FIG. 14, the magnetooptical recording and reproducing apparatus according to the present invention can selectively perform a predetermined recording and/or reproduction function in a known manner.

Figure 14:
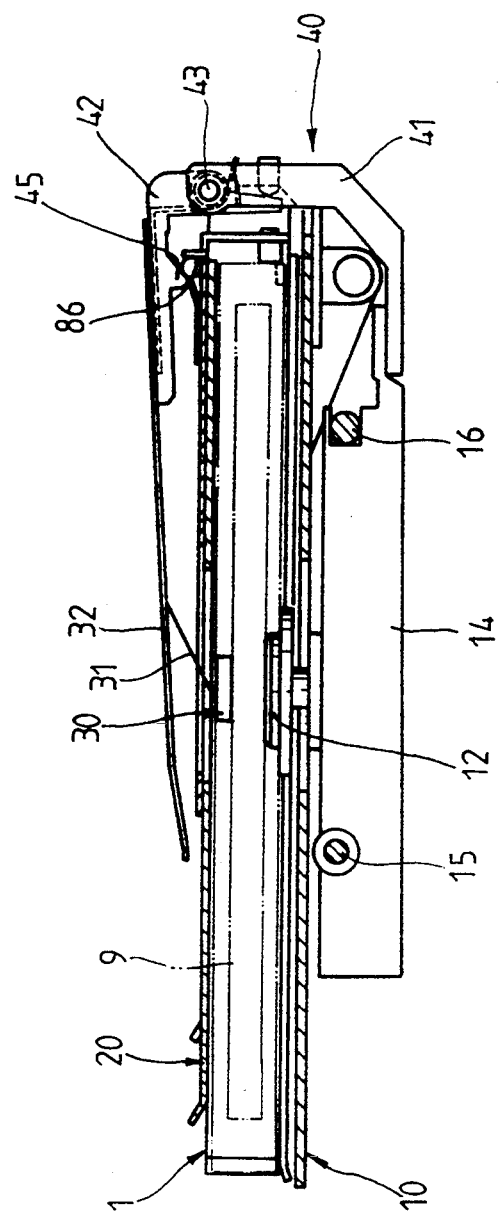
FIG. 14 is a cross-sectional view of the magnetooptical recording/reproducing apparatus of the preferred embodiment, taken along line B—B of FIG. 12.
Figure 15:
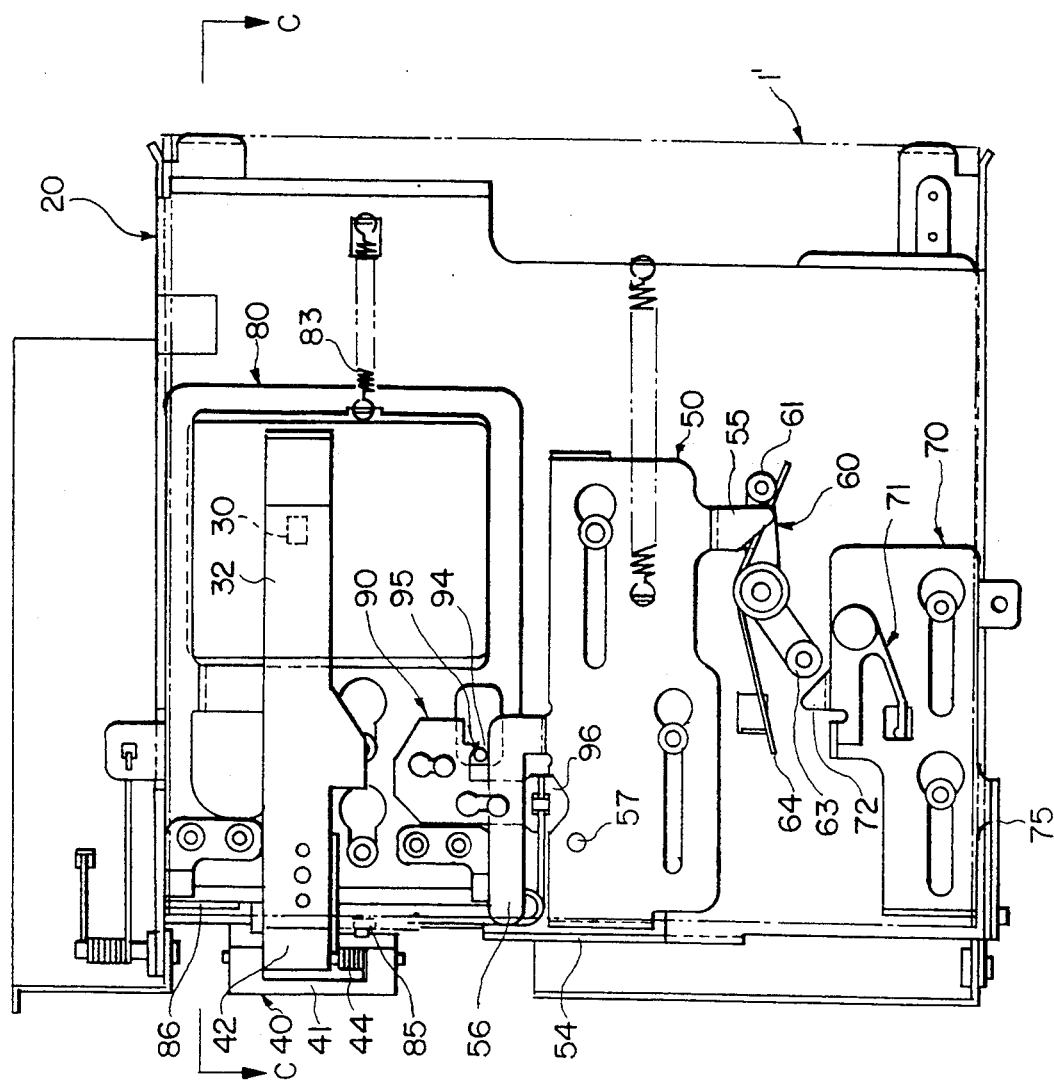
FIG. 15 is a plan view to illustrate a state in which a reproduction-only mini disk is inserted into the cartridge holding member of the magnetooptical recording/reproducing apparatus of the preferred embodiment shown in FIG.3.

Next, to eject mini-disk 1 from the position of FIG. 14 cartridge holding member 20 is opened, so that link 75 pulls locking releasing member 70 in the opposite direction of a5 denoted in FIG. 12. Accordingly, spring member 71 of locking releasing member 70 pushes locking releasing pin 63 of locking member 60, and thereby locking member 60 rotates clockwise. Thus, locking pin 61 is released from locking part 55 of ejecting member 50, for unlocking. Namely, ejecting member 50 becomes unlocked to thereby move in the opposite direction of a4 (FIG. 11) due to the restoring force of spring 53 which has been stretched, whereby mini-disk 1 is ejected as in FIG. 10.

Figure 17:
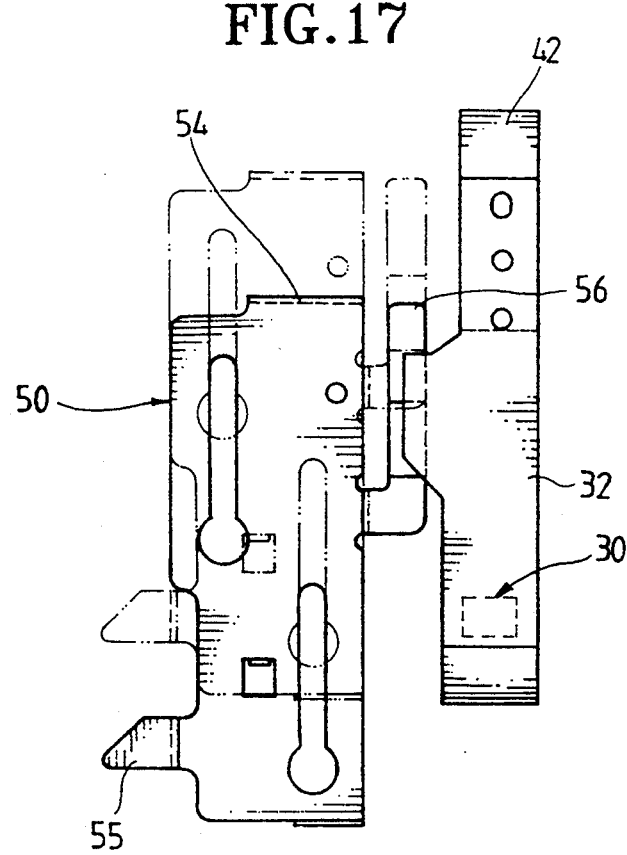
FIG. 17 is a plan view for illustrating the operation of the cartridge extracting member and the head supporting member of the magnetooptical recording/reproducing apparatus of the preferred embodiment.
Figure 18:
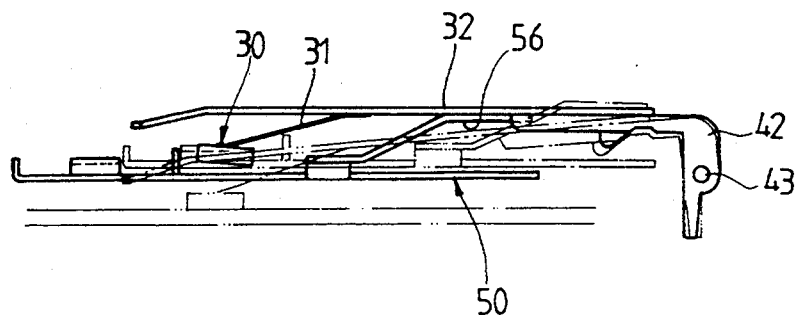
FIG. 18 is a side view for illustrating the operation of the cartridge extracting member and the head supporting member shown in FIG. 17.

In the meantime, triggering pin 57 of ejecting member 50 moves along the ejecting direction (opposite to a4), while triggering locking releasing portion 96 of slide locking member 90. Therefore, slide locking member 90 is pushed upward so as for the locking portion 95 to be released from locking pin 94, whereby slide member 80 returns to its initial position due to the restoring force of spring 83. Accordingly, holding bar 86 also returns to its initial position, so that magnetic head 30 moves upward by virtue of engagement between holding bar 86 and protruded portion 45. Head holder 56 formed on extracting member 50 moves in the ejecting direction as shown in FIGS. 17 and 18, thereby moving head supporting member 32 upward because of the sloped configuration of head holder 56 (see FIG. 8). Therefore, damage to mini-disk 1 during its ejection is prevented because magnetic head 30 does not come into contact with the surface of the mini-disk.

Figure 16:
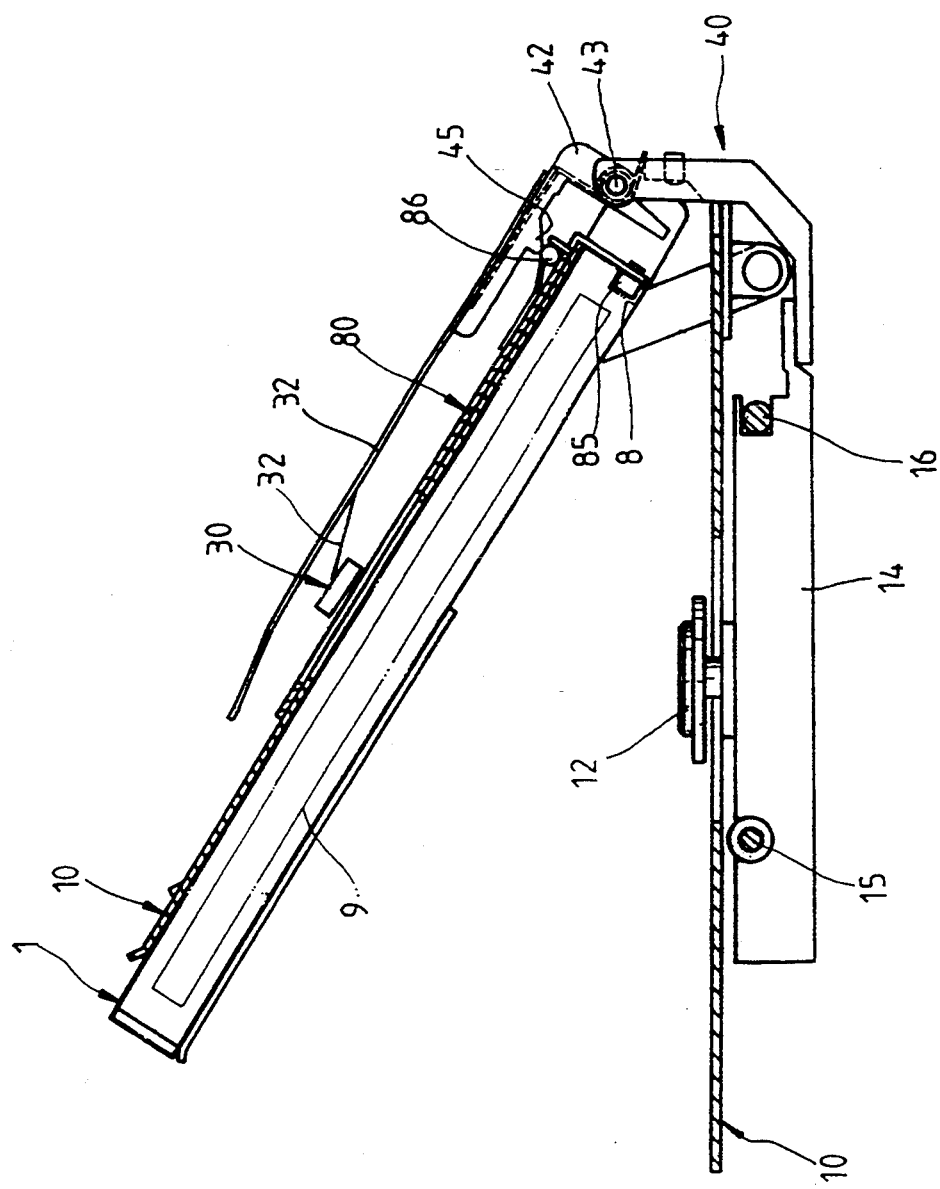
FIG. 16 is a cross-sectional view of the magnetooptical recording/reproducing apparatus of the preferred embodiment, taken along line C—C of FIG. 15.

On the other hand, when reproduction-only mini-disk 1' is received in cartridge holding member 20, protruded pin 85 of slide member 80 is inserted into recognition groove 8' of mini-disk 1', so as not to push slide member 80 as shown in FIG. 16. Here, protrusion 45 of head connection portion 42 is supported by holding bar 86 coupled with slide member 80, which thereby prevents the downward movement of magnetic head 30. Also, slide member 80 remains in an unpushed condition, so that slide locking member 90 supported by slide member 80 can stay in its original location (FIG. 10). All other operations are the same as those of the recordable mini-disk.

Namely, according to the present invention, the reproduction-only mini-disk without the shutter on the upper surface thereof avoids contact with the magnetic head. Therefore, recording and reproduction can be performed most optimally.

Figure 19:
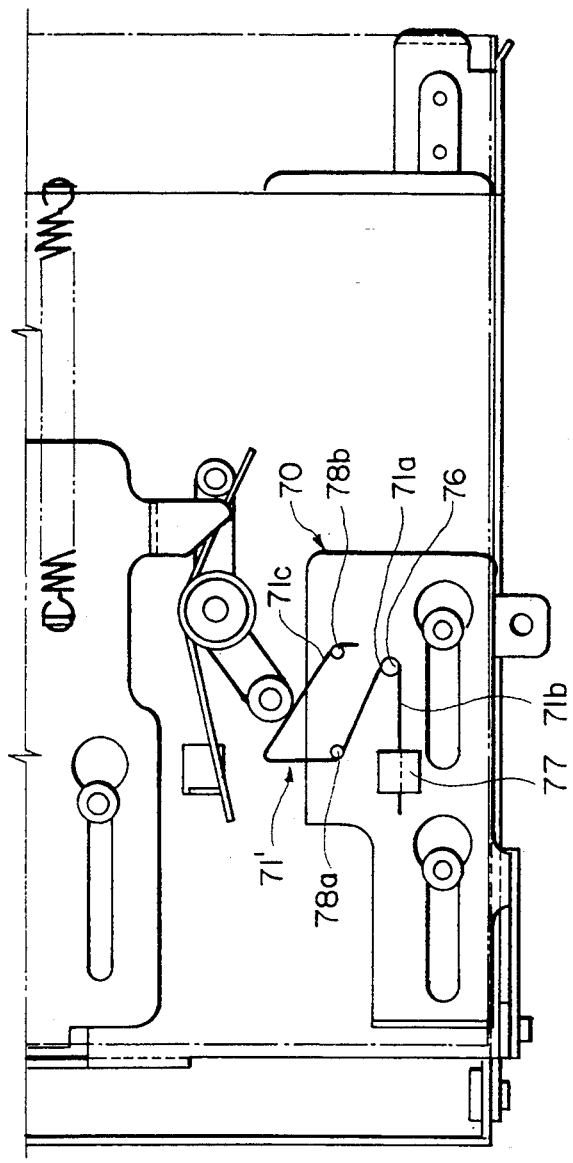
FIG. 19 is a plan view of a cartridge extracting portion according to a second preferred embodiment of the present invention.

FIG. 19 shows a second preferred embodiment of an ejecting device according to the present invention. A locking releasing member 70 is combined with a spring member 71'. Spring member 71' is shaped into multiple bends along an S-shaped path, having middle portion 71a supported by a fixing pin 76, one end 71b permanently supported by a fixed protrusion 77 and the other end 71c supported by two guide supporting pins 78a and 78b, while fixing pin 76 and fixed protrusion 77 are installed on locking releasing member 70. End 71c of spring member 71' is elastically bent only by the movement of locking releasing member 70 in the a6 direction, but is not bent by movement in the direction reverse to the a6 direction. Therefore, locking releasing pin 63 of locking member 60 is struck so that locking member 60 rotates only during the opening of cartridge holding member 20. However, conversely, locking member 60 does not rotate in the case of closing cartridge holding member 20.

Figure 20:
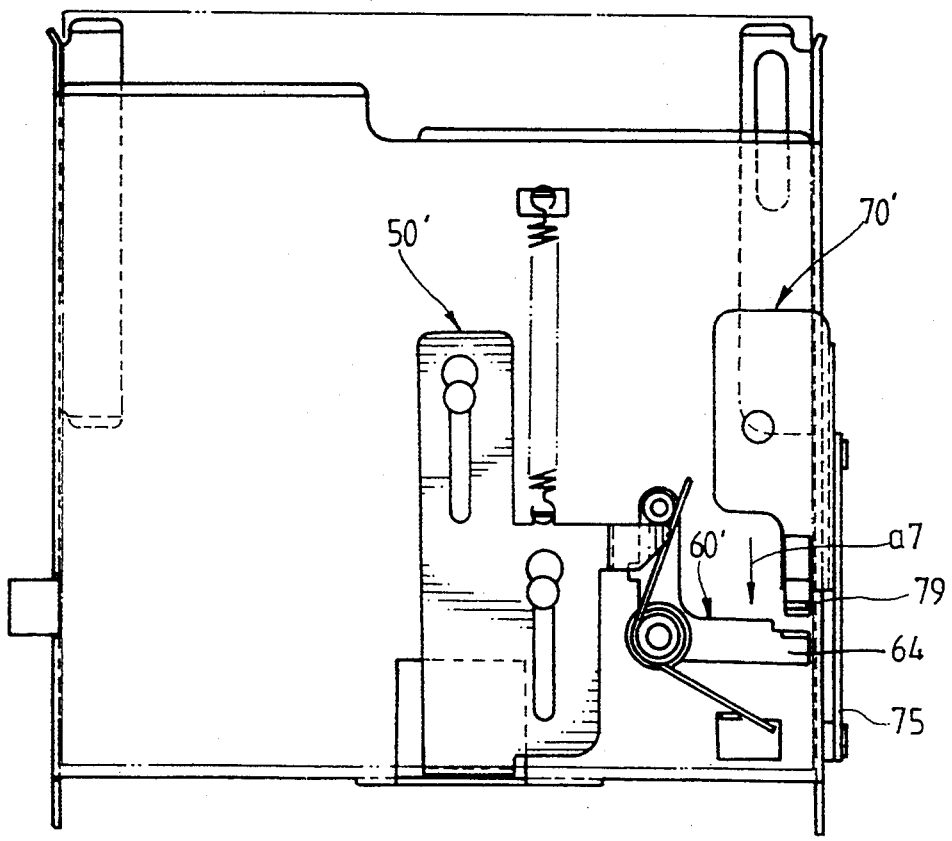
FIG. 20 is a plan view of a cartridge extracting portion according to a third preferred embodiment of the present invention which corresponds to those shown in FIGS. 8 and 19.

Next, FIG.20 shows a third preferred embodiment of an ejecting device according to the present invention. Here, the aforementioned spring member is excluded, and instead, an end portion 64 of locking member 60' is formed longer and a contacting member 79 is established on locking releasing member 70' to contact end portion 64. Thus, when cartridge holding member 20 is opened, locking releasing member 70' moves in an a7 direction, and contacting member 79 pushes the end portion of locking member 60'. Thus, locking member 60' rotates for the unlocking of ejecting member 50'.

As described above, the magnetooptical recording and reproducing apparatus according to the present invention has a simple structure by which a disk cartridge is loaded or unloaded with insertion into a door-type cartridge holding member, and therefore the apparatus can be compact. Also, no electrical power is required for the opening or closing of the cartridge holding member and for the raising and lowering of the magnetic head. Accordingly, the present invention can provide a miniaturized magnetooptical recording/reproducing apparatus capable of being mounted on computer systems as well as being conveniently carried for portable use.

What is claimed is:

1. A magnetooptical recording/reproducing apparatus for recording/reproducing information, using a disk cartridge which houses a magnetooptical disk in a rotatable state, said apparatus having a deck on which the disk cartridge is loaded, an optical pickup assembly movably seated on the deck to project a focused light beam onto one surface of the magnetooptical disk, and a magnetic head for applying a magnetic field onto the other surface of the magnetooptical disk, said apparatus comprising:

a cartridge holding member adopted to receive the disk cartridge when the disk cartridge is loaded into the apparatus in a first direction, said cartridge holding member being pivotally mounted to the deck, so that the disk can be moved between a closing position, in which the disk cartridge is loaded on the top of the deck, and an opening position in which the disk cartridge is detached from the top of the deck, when said disk cartridge is loaded into the apparatus;

a connecting member which pivotally couples the magnetic head and the optical pickup assembly so that the magnetic head moves together with the optical pickup assembly with respect to a radial direction of the magnetooptical disk and is pivotal in the movement direction of the cartridge holding member with respect to the optical pickup assembly; and magnetic head lifting means interlocked with the recordable disk cartridge which is inserted in the cartridge holding member, so as to lower the magnetic head toward the magnetooptical disk when the magnetooptical disk is a recordable type and to raise the magnetic head away from the magnetooptical disk when the magnetooptical disk is not a recordable type said magnetic head lifting means comprises:

a slide member which is slidable with respect to said cartridge holding member, said slide member having a contact element which comes into contact with the disk cartridge when the disk cartridge is loaded in the apparatus to determine whether or not the disk cartridge is recordable, Said contact element engaging with a recess formed in said disk cartridge to be moved in a direction parallel to said first direction through a predetermined distance, and being elastically biased to return to an initial position when the disk cartridge is ejected from the apparatus: and an interlocking means for interlocking the magnetic head and the slide member so as to lift the magnetic head according to the movement of the slide member.

2. A magnetooptical recording/reproducing apparatus as claimed in claim 1, wherein said connecting member comprises a pickup connecting portion connected to the optical pickup assembly, a head connecting portion connected to the magnetic head, and a hinge for connecting the pickup connecting portion and the head connecting portion.

3. A magnetooptical recording/reproducing apparatus as claimed in claim 2, further comprising a spring member for elastically biasing the head connecting portion in one direction.

4. A magnetooptical recording/reproducing apparatus as claimed in claim 2, wherein the angle of the head connecting portion is set with respect to the pickup connecting portion so as to adjust the horizontal position of the magnetic head.

5. A magnetooptical recording/reproducing apparatus as claimed in claim 1, further comprising slide member locking means for locking the moving state of the slide member and releasing the locking state, by being interlocked with the disk cartridge.

6. A magnetooptical recording/reproducing apparatus as claimed in claim 5, wherein said slide member locking means comprises a slide locking member which is movable perpendicular to the moving direction of the slide member.

7. An apparatus as recited on claim 1, wherein said interlocking means comprises a cylindrical bar extending in a direction parallel to the radial direction of the disk.

8. A magnetic head driving apparatus for a magnetooptical disk player using a disk cartridge which receives a magnetooptical disk, and having a moving cartridge holding member which receives the disk as the disk is inserted in a first direction, an optical pickup assembly moving within a range of the radius of the magnetooptical disk to project a focused light beam onto one surface of the magnetooptical disk, and a magnetic head for applying a magnetic field onto the other surface of the magnetooptical disk, said apparatus comprising:

a connecting member which pivotally couples the optical pickup assembly and the magnetic head so that the magnetic head moves together with the optical pickup assembly in the diameter direction of the magnetooptical disk and is pivotal in a direction of movement of the cartridge holding member with respect to the optical pickup assembly; and lifting means which recognizes whether or not the disk cartridge received in the cartridge holding member is recordable and to lower the magnetic head when the disk cartridge is of a recordable type and to raise the magnetic head when the disk is of a nonrecordable type said magnetic head lifting head means comprises:

a slide member which is slidable with respect to said cartridge holding member, said slide member having a contact element which comes into contact with the disk cartridge when the disk cartridge is loaded in the apparatus to determine whether or not the disk cartridge is recordable, said contact element engaging with a recess formed in said disk cartridge to be moved in a direction parallel to said first direction through a predetermined distance, and being elastically biased to return to an initial position when the disk cartridge is ejected from the apparatus; and an interlocking means for interlocking the magnetic head and the slide member so as to lift the magnetic head according to the movement of the slide member.

9. A magnetic head driving apparatus as claimed in claim 8, wherein said connecting member comprises a pickup connecting portion connected to the optical pickup assembly, a head connecting portion connected to the head, and a hinge connecting the pickup connecting portion and the head connecting portion.

10. A magnetic head driving apparatus as claimed in claim 9, further comprising a spring member for elastically biasing the head connecting portion in one direction.

11. A magnetic head driving apparatus as claimed in claim 9, wherein the angle of the head connecting portion is set with respect to the pickup connecting portion so as to adjust the horizontal position of the magnetic head.

12. A magnetic head driving apparatus as claimed in claim 8, further comprising a slide member locking means for locking the moving state of the slide member and releasing the locking state based on the motion of extracting the disk cartridge.

13. A magnetic head driving apparatus as claimed in claim 12, wherein said slide member locking means comprises a slide locking member moveable in a direction which is perpendicular to the movement direction of the slide member.

14. An apparatus as recited in claim 8, wherein said interlocking means comprises a cylindrical bar extending in a direction parallel to the radial direction of the disk.

* * * * *